Sept. 12, 1933.  A. C. HAYDEN  1,926,588
MOTION PICTURE FILM REEL
Filed Jan. 15, 1930  2 Sheets-Sheet 1
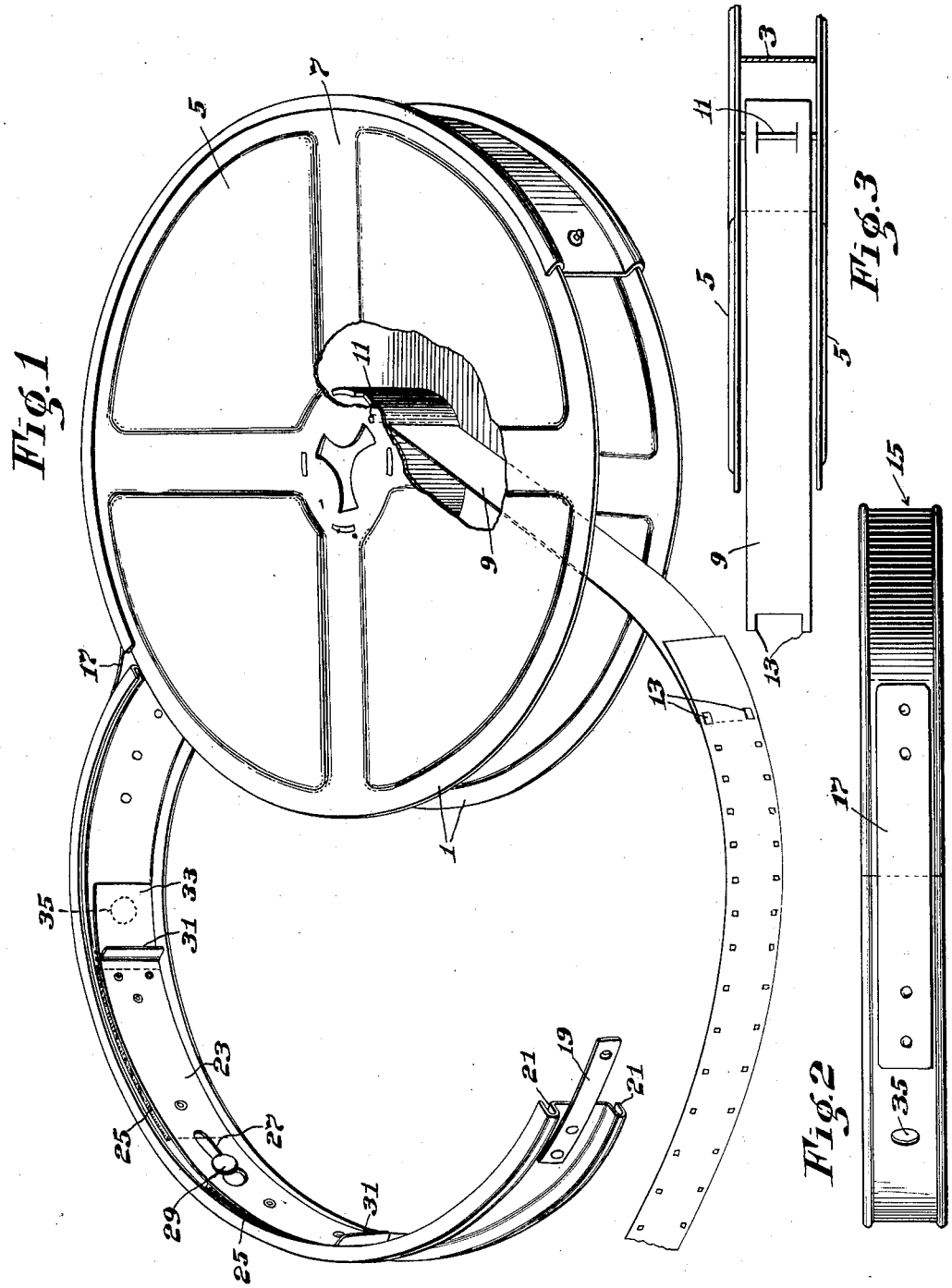
INVENTOR:
Arthur C. Hayden
BY
Henry T. Williams
ATTORNEY Sept. 12, 1933.  A. C. HAYDEN  1,926,588
MOTION PICTURE FILM REEL
Filed Jan. 15, 1930   2 Sheets-Sheet 2
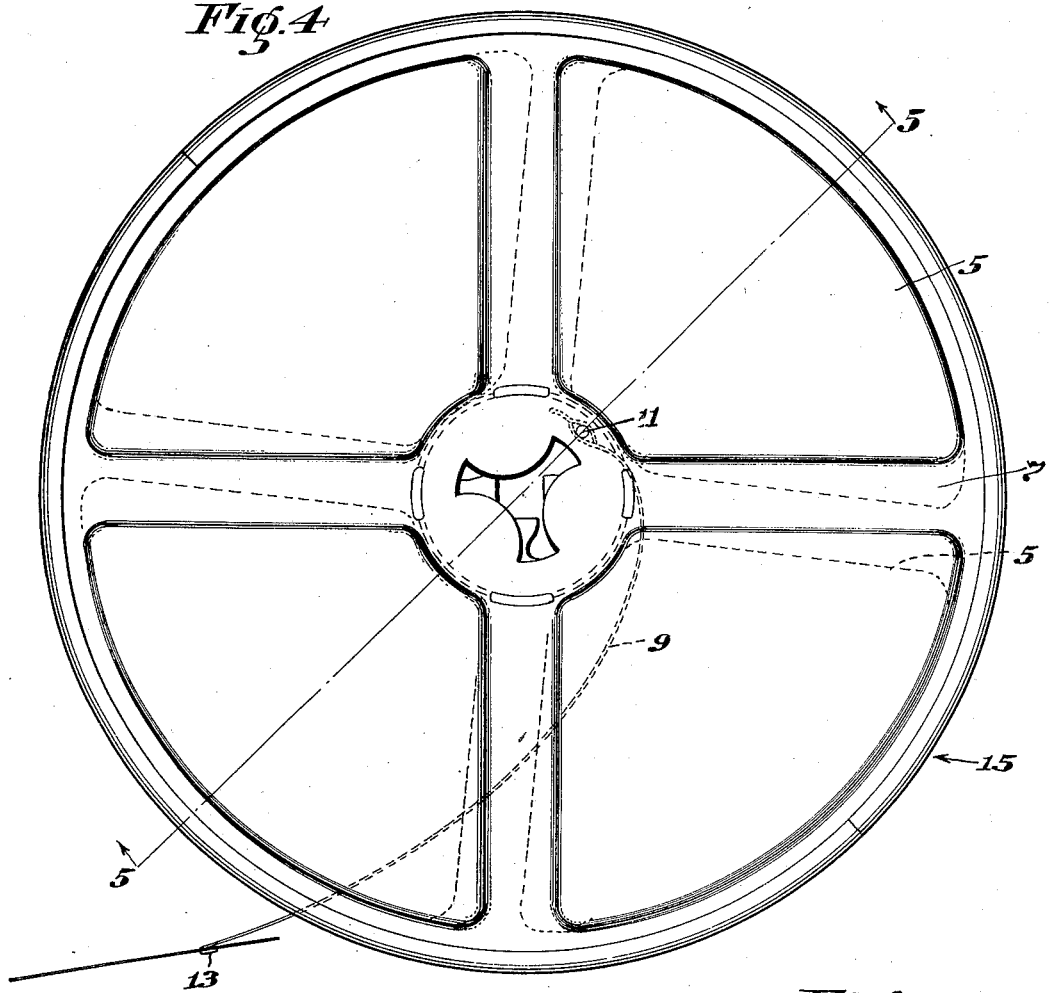
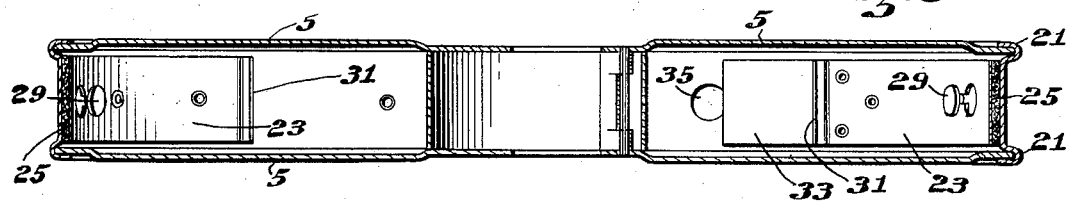
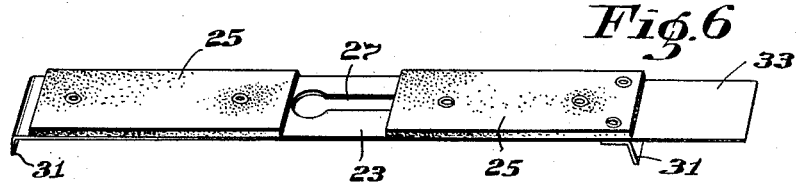
INVENTOR:
Arthur C. Hayden
BY Henry T. Williams
ATTORNEY Patented Sept. 12, 1933

1,926,588

UNITED STATES PATENT OFFICE 1,926,588

MOTION PICTURE FILM REEL

Arthur C. Hayden, Brockton, Mass.

Application January 15, 1930. Serial No. 420,983

2 Claims. (Cl. 206—52)

The invention to be hereinafter described relates to motion picture film reels.

Motion picture films should be stored in moist air to prevent them from becoming brittle and breaking. Heretofore, film reels have been stored in humidor cabinets or in individual metal boxes each comprising a body and a cover formed to conform to the shape of the reel. A moistened pad of felt is placed in the box to keep the air moist.

One of the purposes of the present invention is to eliminate the necessity for these boxes. An improved form of reel is provided having solid side plates. A metal rim is wrapped around the peripheries of the side plates, and carries moisture containing means, the construction being such that the side plates and hub of the reel together with the rim constitute an enclosure which serves as a humidor.

Another purpose of the invention is to provide means whereby the film may be quickly and easily connected to the reel hub and detached therefrom.

With the aforesaid and other purposes in view, the character of the invention may be best understood by reference to the following description of one good form of the invention shown in the accompanying drawings, wherein:

Fig. 1 is a perspective view of the reel and cover, one of the parts of the latter being swung to open position;

Fig. 2 is an edge view of the cover showing the hinge connecting the parts thereto;

Fig. 3 is a detail showing the strip for connecting the film with the reel hub;

Fig. 4 is a side view of the reel and cover;

Fig. 5 is a transverse section taken on line 5—5 of Fig. 4; and

Fig. 6 is a perspective view of one of the moisture pad carrying strips.

Referring to the drawings, the reel shown therein as one good form of the invention comprises a pair of side plates 1 connected by a hollow hub 3, said plates having segmentally-shaped panels 5 extruded outwardly, and ribs or spokes 7 extruded inwardly. The marginal portions of the plates at the peripheries thereof are extruded inwardly and are in the same planes as the spokes. The construction is such that the ribs are engaged by the edges of the convolutions of film wound on the hub, but the panels do not engage said edges and leave air chambers. The spokes of one of the side plates are offset somewhat from the spokes of the other plate, in order that the air chambers may communicate with one another.

The old form of film reel has openings in the side plates thereof through which the fingers may be inserted in attaching an end of the film to the reel hub. On the other hand, the side plates of the present reel are solid, so that the film cannot be attached to the hub in the manner above described. A strip 9 is provided of a special brass composition which may be flexed sharply back and forth repeatedly without breaking. One end of this strip is entered through a slot in the hub, and connected to a pin 11 extending between the side plates. The strip is sufficiently long to project somewhat beyond the peripheries of the side plates, and at the outer end thereof are a pair of spurs 13 adapted to be inserted through a pair of sprocket holes of the film. Preparatory to connecting the spurs to the film, they are bent out and lie in the plane of the film, as will be noted in Fig. 3. After they have been inserted in the film holes, they are bent back, as will be noted in Fig. 1. The spurs have sufficient strength to hold the film in winding the film on the reel, but they have sufficient flexibility to straighten out and release the film after it has been unwound from the reel and given a slight pull.

To provide closure for the film and keep it in moist air, a cover or rim 15 is provided, in the present instance made of two parts connected by a spring hinge 17. Diametrically opposed to the hinge is a snap clasp 19 for locking the two parts together. The rim has grooves 21 formed to receive the peripheries of the side plates.

Within each part of the cover is a metal strip 23 having moisture receiving pads 25 secured to the back thereof. To detachably connect the strip with the cover, the former has a key hole slot 27 receiving a headed stud 29 projecting inward from the cover. The ends 31 of the strip may be bent inward to facilitate sliding of the strip to locking and unlocking positions. The strip may be quickly and easily removed when it is desired to moisten the pads.

One of these strips has a thin metal flap 33 projecting from an end thereof and adapted to cover or uncover a hole 35 in the rim. The length of the key-hole slot 27 is such that the strip may be slid to cover or uncover the hole, but without releasing the strip from the stud 29. If it is desired to store the reel in a large humidor cabinet, the strip will be adjusted so that the flap 33 will uncover the hole 35 and admit the moist air in the humidor into the closure formed by the side plates, hub and cover rim.

The cover may be quickly and easily applied to the side plates and removed therefrom. The side plates of the old form of film reel are liable to have portions bent toward each other, making it difficult to connect the film to the hub, or if the film has already been wound onto the reel, there is danger of breaking the film when being unwound from the reel. Therefore, the grooves 21 of the cover of the present invention are desirable, since they receive the peripheries of the side plates and prevent them from being bent in toward each other during handling and storage of the reel.

This reel and cover are simple in construction and cheap to manufacture. The construction is such that the film on the reel may be maintained in moist air and not get in brittle condition.

It will be understood that the invention is not limited to the specific embodiment shown, and that various deviations may be made therefrom without departing from the spirit and scope of the appended claims.

What is claimed is:

1. A motion picture film reel comprising solid side plates, a hub between the plates, a cover encircling the edges of the plates, a holder having a felt moisture receiving pad attached thereto, and means detachably securing the holder to the inner side of the cover, the side plates being formed to space the film therefrom and permit moisture to pass from the pad to the edges of the film on the hub.

2. A motion picture film reel comprising solid side plates, a hub between said plates, a cover removably mounted on and encircling the peripheries of said plates, and a holder on the cover having a moisture receiving felt pad, said cover having an aperture therein and said holder having means for covering and uncovering said aperture.

ARTHUR C. HAYDEN.